Dec. 8, 1953      L. R. SIMPSON      2,661,869
OIL CHANGER

Filed April 30, 1948      3 Sheets-Sheet 1

Leonard R. Simpson
INVENTOR.

BY Chas. Denegre
Attorney.

Dec. 8, 1953 L. R. SIMPSON 2,661,869
OIL CHANGER
Filed April 30, 1948 3 Sheets-Sheet 2

Leonard R. Simpson
INVENTOR.

BY Chas. Denegre
Attorney.

Dec. 8, 1953                L. R. SIMPSON                2,661,869
                              OIL CHANGER
Filed April 30, 1948                                3 Sheets-Sheet 3

Leonard R. Simpson
            INVENTOR.
BY Chas. Denegre
            Attorney.

Patented Dec. 8, 1953

2,661,869

UNITED STATES PATENT OFFICE 2,661,869

OIL CHANGER

Leonard R. Simpson, Birmingham, Ala.

Application April 30, 1948, Serial No. 24,119

1 Claim. (Cl. 222—128)

This invention relates to an oil changer, especially for use in changing the oil in an automobile crank case. It has for its main objects to provide such a device that will be highly efficient for the purpose intended, easy to use, very attractive in appearance, possessing much advertising value in attracting business in its class, and extremely durable.

At the present time in automobile filling stations in order to change the oil in the crank case of a car it is necessary to remove a plug in the bottom of the case and allow the oil to drain out. This is a slow and unsatisfactory method, especially so when the customer is in a hurry. The present invention provides modern and efficient means for changing the oil easily and quickly.

Other objects and advantages will appear from the drawings and description.

Figure 1:
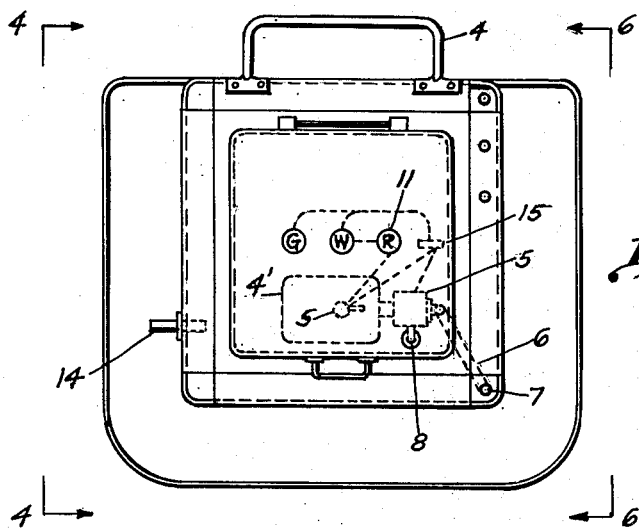
Figure 8:
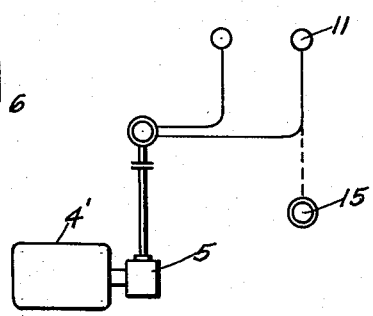
Figure 2:
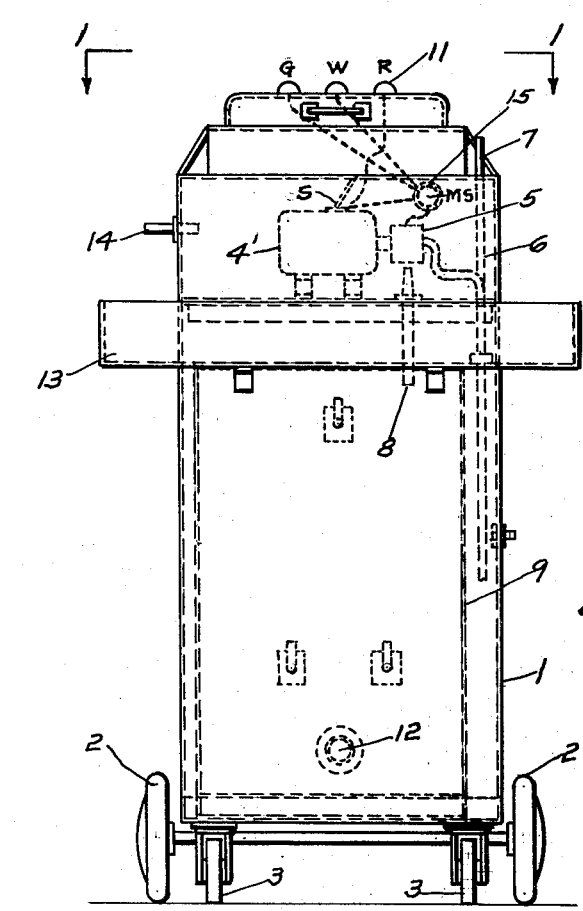
Figure 3:
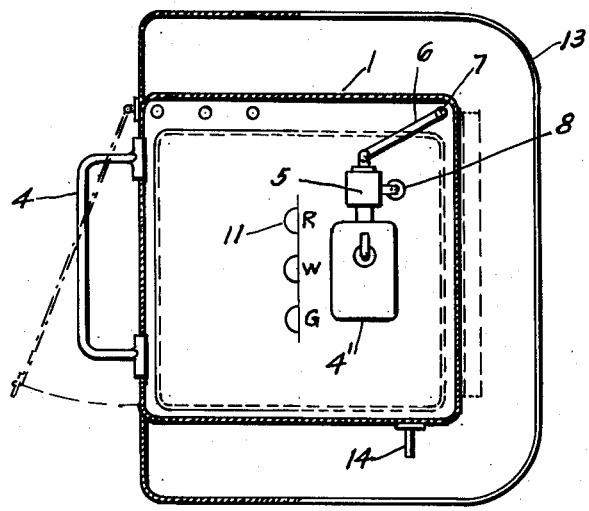
Figure 4:
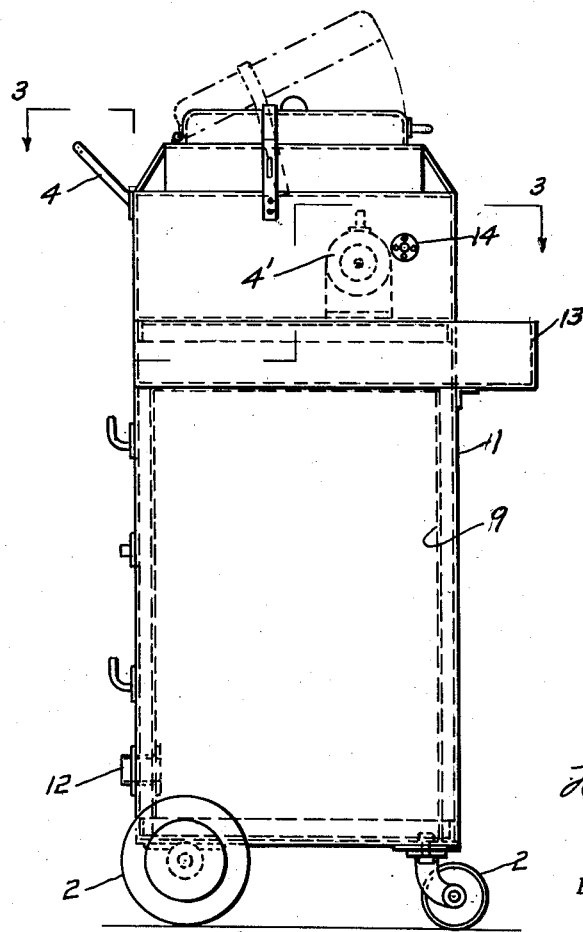
Figure 9:
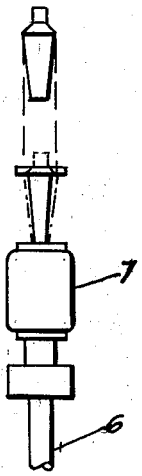
Figure 5:
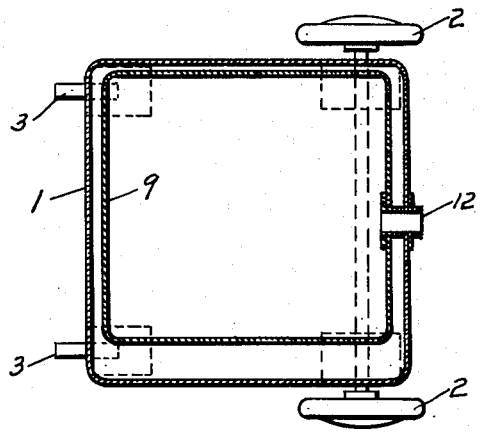
Figure 6:
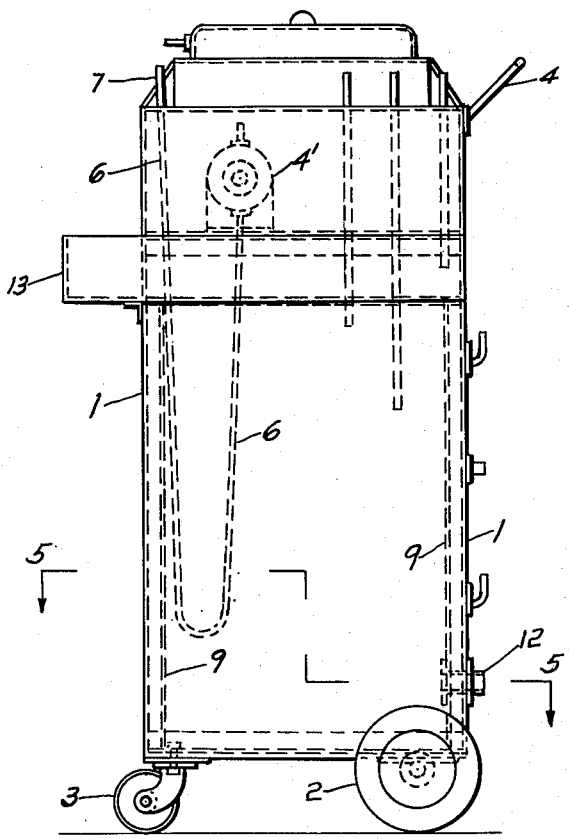
Figure 7:
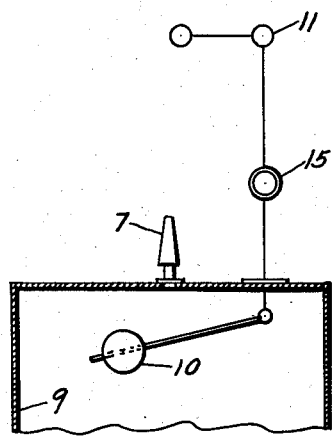

By referring generally to the drawings, part of this application, it will be observed that Fig. 1 is a top plan view on line 1—1 of Fig. 2 of the assembled device; Fig. 2 is a front elevational view; Fig. 3 is a sectional view on line 3—3 of Fig. 4; Fig. 4 is a side elevational view; Fig. 5 is a sectional view on line 5—5 of Fig. 6; Fig. 6 is the other side elevational view; Fig. 7 is a general fragmentary view showing positions of lights, main electric switch, quick connector nozzle, floatgage, and upper portion of receiving tank; Fig. 8 is a diagrammatic view showing indicating lights, main switch, electric motor and pump; and Fig. 9 is an enlarged view of part of hose and connecting means.

Similar reference numerals refer to similar parts throughout the several views.

Referring to the drawings in detail it will be seen that the device comprises a main case 1 mounted on wheels 2 and swivel rollers 3, and with a suitable handle 4. Within the upper portion of the case there is mounted an electric motor 4' for driving a pump 5. Attached to the pump there is a hose 6 with an end connection 7 adapted to use different sizes of tubes designated as dipsticks for inserting into various sizes of gage or oil filling holes in the crank cases of automobiles to thus draw or suck the old oil therefrom for the purpose of putting in fresh oil. Any suitable connecting means may be used on the end of the suction hose such as indicated much enlarged in Fig. 9. When the oil is drawn from the crank case it passes through the pump into a discharge pipe 8 and into the tank 9 within the case of the device. When the oil in the tank reaches a certain level a float 10 by connecting means causes a red light 11 to burn to thus indicate that the tank should be emptied through a drain pipe plug 12 in the bottom portion of the device case, or the pump also may be reversed by mechanism built into the pump for the purpose so that the tank may be drained by one of the dipsticks. A tray 13 attached to the upper part of the device case is for use in holding a supply of canned stock oil. A suitable electric supply connection 14 for the motor is provided in the upper part of the device case. A main switch 15 controls the supply of current to the motor. Strainers are provided in the oil connections leading to the pump for the purpose of preventing dirt from accumulating in the pump.

Also a glass tube may be used as part of the suction pipe in order that the customer may see the old oil being drawn from the crank case.

From the foregoing it will appear that to use the oil changer it is placed near an automobile, a proper size dipstick is connected to the suction hose, the dipstick is inserted through an opening in the crank case of the motor and into the oil in the case, the electric motor is started which operates the pump to thus draw or suck the old oil from the crank case into the receiving tank in the device case. This operation will require only a few minutes, rather than the slow, troublesome method now in general use in filling stations.

The various parts of the oil changer may be made of any material or mechanism suitable for the purpose. The invention resides in the arrangement and combination of the parts, not the material of which they are made. Also the oil changer may be made in different sizes and capacities.

While I have shown and described the preferred embodiment of my invention, I do not wish to limit same to the exact and precise details of structure, but reserve the right to make all modifications and changes so long as they remain within the spirit and scope of the invention and the following claim.

Having described my invention I claim:

An automobile motor crank case oil changer of the character described comprising; a main containing case having a substantially square shape in cross section, a square shaped tank mounted within the main case and being of a size to occupy substantially all of the lower and middle portion of the main case, said tank having a drain pipe in the lower portion of one of its walls and extending through the wall of the main case, an electric motor mounted within the upper portion of the main case, a rotary type pump attached near and to said motor and being adapted to revolve clock-wise and anti-clock-wise, a first conduit connecting said pump to said tank, a second conduit connected to said pump at one end and adapted to be inserted in the crank case of an automobile at its other end, said pump being adapted to withdraw fluid through said second conduit and discharge same into said tank through said first conduit when revolving in one direction, and withdraw the fluid from said tank through said first conduit and discharge it through said second conduit when revolving in the opposite direction.

LEONARD R. SIMPSON.

References Cited in the file of this patent

UNITED STATES PATENTS

| Number | Name | Date |
|---|---|---|
| 1,756,410 | Wertz | Apr. 29, 1930 |
| 1,882,196 | Siems | Oct. 11, 1932 |
| 1,886,098 | Hedglon | Nov. 1, 1932 |
| 1,955,169 | Bertschinger | Apr. 17, 1934 |
| 2,020,350 | Bertschinger | Nov. 12, 1935 |
| 2,124,798 | Schuler | July 26, 1938 |
| 2,158,914 | Rinehart | May 16, 1939 |
| 2,552,749 | Tabet | May 15, 1951 |